B. NAGELVOORT.
HYDRAULIC BRAKE MECHANISM.
APPLICATION FILED MAY 31, 1912.

1,149,938.

Patented Aug. 10, 1915.
2 SHEETS—SHEET 1.

WITNESSES

INVENTOR
Bernard Nagelvoort
by Milton Tibbetts
Attorney

B. NAGELVOORT.
HYDRAULIC BRAKE MECHANISM.
APPLICATION FILED MAY 31, 1912.
1,149,938.
Patented Aug. 10, 1915.
2 SHEETS—SHEET 2.
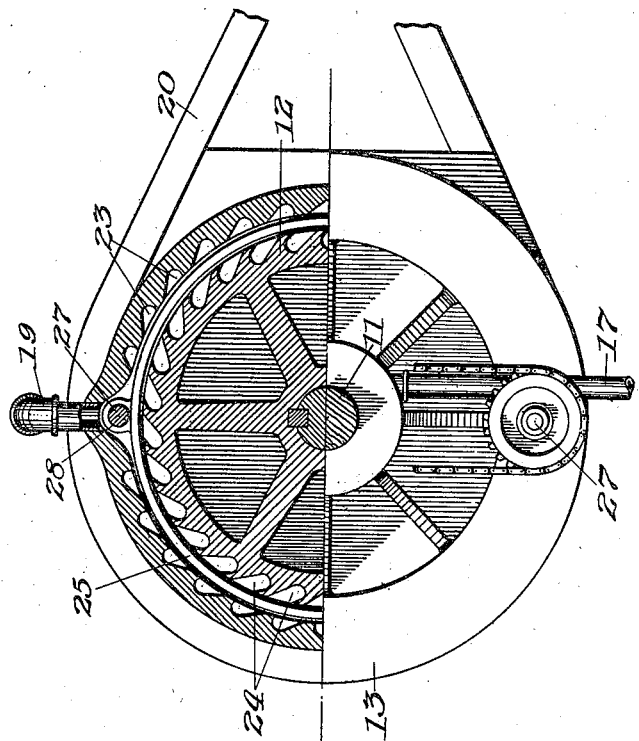
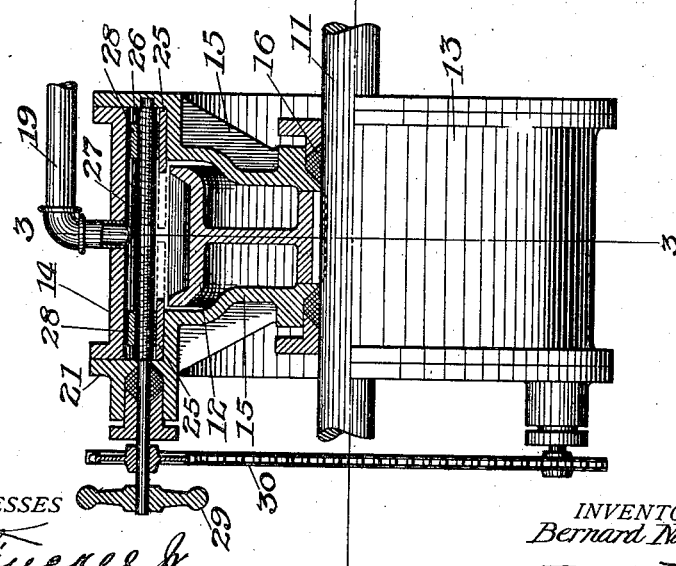
WITNESSES
INVENTOR
Bernard Nagelvoort
by
Attorney

UNITED STATES PATENT OFFICE.

BERNARD NAGELVOORT, OF DETROIT, MICHIGAN, ASSIGNOR TO PACKARD MOTOR CAR COMPANY, OF DETROIT, MICHIGAN, A CORPORATION OF MICHIGAN.

HYDRAULIC BRAKE MECHANISM.

1,149,938. Specification of Letters Patent. Patented Aug. 10, 1915.

Application filed May 31, 1912. Serial No. 700,902.

*To all whom it may concern:*

Be it known that I, BERNARD NAGELVOORT, a citizen of the United States, and resident of Detroit, Wayne county, State of Michigan, have invented certain new and useful Improvements in Hydraulic Brake Mechanism, of which the following is a specification.

This invention relates to hydraulic brake mechanism and particularly to a brake of that character designed for absorbing horse power in testing motors of various kinds.

One of the objects of the invention is to construct a mechanism of the above type which shall be efficient in operation and simple in construction and therefore inexpensive to build.

Figure 1:
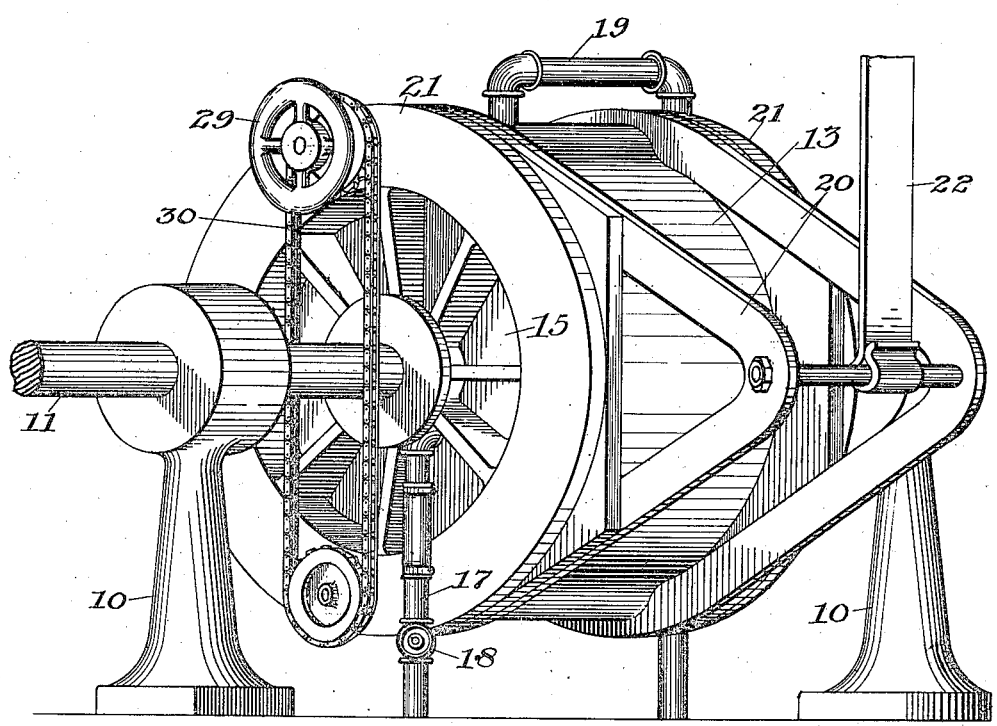

Other objects of the invention will appear from the following description taken in connection with the drawings, in which, Figure 1 is a perspective view of a machine built in accordance with this invention; Fig. 2 is a part longitudinal section and part elevation of the machine shown in Fig. 1; Fig. 3 is a part section on the line 3—3 of Fig. 2, the lower part of the view being in elevation; and Fig. 4 is an enlarged sectional view.

In the drawings the machine is illustrated as being supported on separated standards 10, in which the shaft 11 is mounted in suitable bearings. A rotor 12 is keyed to the shaft 11 and a drum or casing 13 surrounds the rotor and the shaft, being supported on the latter. This drum 13 is composed of a cylindrical body portion 14 and end plates 15 which plates are provided with packing glands 16 thereby making a water tight compartment in which the rotor operates. A liquid such as water, is supplied to the interior of the drum by an inlet pipe 17 controlled by hand valve 18, and by means of an outlet pipe 19 at the top of the drum the latter has a constant flow of water through it. As shown, the inlet pipe 17 supplies the liquid to the drum at a point radially inward of said cavities, from where it flows radially outward past the sides of the rotor and is exhausted through the pipe 19.

The drum has arms 20 suitably connected with its flanges 21 and extending laterally as shown particularly in Figs. 1 and 3, and a link 22 connects the outer end or these arms 20 with a scale or other suitable device for measuring the pull on these arms, the scale not being shown in the drawings. This strap 22 and its connections tend of course, to retain the drum against rotating with the rotor 12.

Figure 4:
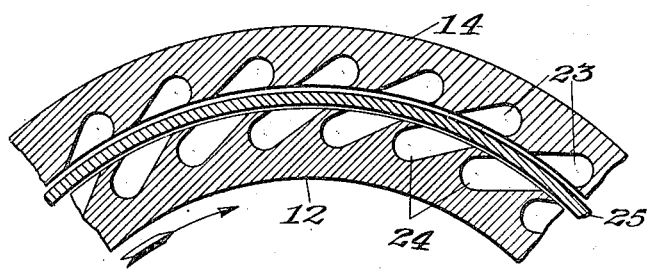

The contiguous walls of the casing member 13 and the rotor 12 are provided with surfaces which are adapted to coöperate with a liquid between them, these surfaces being arranged radially of each other, as shown particularly well in Figs. 3 and 4. Referring to said figures, it will be seen that the inner periphery or inside surface of the body portion 14 of the drum is shown as formed with a series of tangentially extending cavities or slots 23, and the periphery of the rotor 12 is formed with similar cavities or slots 24 opposed to the cavities or slots in the drum.

It will be understood that, with the drum filled with water or other fluid, the rotation of the rotor 12 in the direction indicated by the arrow in Fig. 4 will be resisted by reason of the fact that the water will be forced into the cavities and torn apart or disintegrated by the edges of the cavities in the rotor acting against the opposing edges of the cavities in the drum.

The amount of resistance offered by the water is determined by the degree to which the cavities in the rotor and in the drum are permitted to oppose each other, and this is determined in the present instance by inserting a ring or rings between the periphery of the rotor 12 and the drum so as to "cut out" as it were one or both sides of the periphery of the rotor.

In the drawings two rings 25 are shown and there is an annular space 26 formed in the drum ends 15 in which these rings normally lie. The rings are inserted into and withdrawn from the space between the cavities of the rotor and of the drum by means of a pair of rods 27 each of which has right and left hand threads thereon which coöperate with threaded blocks 28 on the rings. These rods 27 are operated in unison by a hand wheel 29 and chain and sprocket connection 30, the hand wheel being arranged on the outside of the drum for convenient manual operation.

It will be understood that the rings 25 are moved into the space between the periphery of the rotor and the body portion 14 of the drum for the purpose of decreasing the resistance to the operation of the rotor 12, and the reverse operation takes place when it is desired to increase this resistance.

It will be further understood that the invention is not limited to the specific construction shown but may include many modifications thereof which will be deemed to be covered by the claims.

What I claim is:

1. In a hydraulic brake mechanism, the combination with an outer casing member and an inner relatively rotatable member, said members having separated surfaces adapted to coöperate with a liquid between them and said surfaces being arranged radially of each other, of means for supplying a liquid between said surfaces, means movable independently of said surfaces for varying the degree of coöperation between said surfaces, and means for rotating one of said members.

2. In a hydraulic brake mechanism, the combination with a drum and a rotor therein, said rotor having peripheral tangentially arranged cavities and said drum having similar cavities in its surface opposite and radially of the periphery of said rotor, means adapted to be inserted between said cavities to render them more or less effective, and means for supplying liquid to said drum.

3. In a machine of the class described, the combination with a drum and a rotor therein, said rotor having peripheral tangentially arranged cavities and said drum having similar cavities in its surface opposite the periphery of said rotor, a ring adapted to be inserted and withdrawn from between said cavities to render them more or less effective, and means for supplying liquid to said drum.

4. In a machine of the class described, the combination with spaced supports, a shaft rotatably mounted in said supports, a rotor keyed to said shaft, a drum mounted on said shaft and surrounding said rotor, said rotor and said drum having opposed peripheral cavities, means for holding the drum against rotation, and means for supplying liquid to said drum, of means for rendering said cavities more or less effective comprising a ring adapted to be inserted and withdrawn from between the rotor and the drum.

5. In a machine of the class described, the combination with spaced supports, a shaft rotatably mounted in said supports, a rotor keyed to said shaft, a drum mounted on said shaft and surrounding said rotor, said rotor and said drum having opposed peripheral cavities, means for holding the drum against rotation, and means for supplying liquid to said drum, of a ring adapted to enter the space between the cavities to render them more or less inoperative, and means extending through the end of the drum for positioning said ring.

6. In a machine of the class described, the combination with a drum and a rotor therein, said rotor having peripheral cavities therein and said drum having opposing cavities in its adjacent surface, of a pair of rings adapted to enter the space between the cavities to render them more or less inoperative, and right and left hand threaded rods for simultaneously drawing said rings into said space and withdrawing them therefrom.

7. In a machine of the class described, the combination with a drum and a rotor therein, said rotor having peripheral cavities therein and said drum having opposing cavities in its adjacent surface, of a pair of rings adapted to enter the space between the cavities to render them more or less inoperative, and right and left hand threaded rods engaging each of said rings at two points for simultaneously and uniformly drawing said rings into said space and withdrawing them therefrom.

8. In a hydraulic brake mechanism, the combination with a stationary drum, of a rotor mounted therein, said drum and rotor being formed with relatively radial coöperating cavities, means for supplying a liquid to said drum at a point radially inward of said cavities, means for exhausting the liquid from said drum, and means for operating said rotor.

9. In a hydraulic brake mechanism, the combination with a stationary drum, of a rotor mounted therein, said drum and rotor being formed with relatively radial coöperating cavities, and with a space between the sides of the rotor and the casing for the passage of liquid, means for supplying a liquid to said drum at a point radially inward of said cavities, means for exhausting the liquid from the periphery of the drum, and means for operating said rotor.

In testimony whereof I affix my signature in the presence of two witnesses.

BERNARD NAGELVOORT.

Witnesses:
ALLEN LOOMIS,
GEO. E. GODDARD.